(12) United States Patent
Morimoto

(10) Patent No.: US 9,895,994 B2
(45) Date of Patent: Feb. 20, 2018

(54) VEHICLE CONTROL SYSTEM

(71) Applicant: DENSO CORPORATION, Kariya, Aichi-pref. (JP)

(72) Inventor: Youhei Morimoto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 317 days.

(21) Appl. No.: 14/681,253

(22) Filed: Apr. 8, 2015

(65) Prior Publication Data
US 2015/0291051 A1 Oct. 15, 2015

(30) Foreign Application Priority Data
Apr. 10, 2014 (JP) .................... 2014-81005

(51) Int. Cl.
*B60L 1/00* (2006.01)
*B60L 11/18* (2006.01)
*B60L 11/14* (2006.01)
*B60W 10/00* (2006.01)
*H02J 7/14* (2006.01)

(52) U.S. Cl.
CPC ........... *B60L 11/1862* (2013.01); *B60L 11/14* (2013.01); *B60L 11/1814* (2013.01); *B60W 10/00* (2013.01); *H02J 7/1423* (2013.01); *H02J 7/1446* (2013.01); *H02J 7/1453* (2013.01); *Y02T 10/7005* (2013.01); *Y02T 10/92* (2013.01)

(58) Field of Classification Search
CPC .. B60L 11/1862; B60L 11/14; B60L 11/1814; H02J 7/1423; H02J 7/1446; H02J 7/1453

USPC .......................... 307/9.1, 10.1; 320/103, 104
See application file for complete search history.

(56) References Cited

U.S. PATENT DOCUMENTS

| | | | |
|---|---|---|---|
| 2003/0172643 A1* | 9/2003 | Suzuki ..................... | B60K 6/48 60/284 |
| 2007/0145954 A1* | 6/2007 | Kawahara ........... | B60L 11/1864 320/150 |
| 2010/0152938 A1 | 6/2010 | Aoki et al. | |
| 2012/0293122 A1* | 11/2012 | Murawaka .......... | B60L 11/1816 320/109 |
| 2013/0015814 A1* | 1/2013 | Kelty .................... | B60L 3/0046 320/109 |

FOREIGN PATENT DOCUMENTS

JP 2013-001373 1/2013

* cited by examiner

Primary Examiner — Thomas Skibinski
(74) Attorney, Agent, or Firm — Nixon & Vanderhye P.C.

(57) ABSTRACT

The vehicle control system includes an engine, a battery, a motor generator that generates driving power and generates electric power to charge the battery, a power conversion device that generates driving power to the motor generator and charges the battery, and a control device that controls the engine and the power conversion device. The control device controls the engine and the power conversion device and the remaining capacity of the battery is equal to a target value when the remaining capacity of the battery is equal to or less than the lower threshold. The control device reduces the target value of the remaining value of the battery as compared with a case where temperature of the battery is equal to or more than a threshold value when the temperature of the battery is less than the threshold value.

12 Claims, 5 Drawing Sheets

VEHICLE CONTROL SYSTEM

CROSS REFERENCE TO RELATED APPLICATIONS

This application is based on Japanese Patent Application No. 2014-81005 filed on Apr. 10, 2014, the disclosure of which is incorporated herein by reference in its entirety.

TECHNICAL FIELD

The present disclosure relates to a vehicle control system in which a control device controls a power conversion device to convert generation power of an engine and a motor generator so that remaining capacity of a battery becomes a target value when the remaining capacity of the battery is equal to or less than a low limit threshold.

BACKGROUND

Conventionally, when remaining capacity of a battery is equal to or less than a low limit threshold, so that the remaining capacity of the battery becomes a target value, as a vehicle control system, for example, a hybrid vehicle control system disclosed in patent literature 1 is known. In the vehicle control system, a control device controls a power conversion device to convert generation power of an engine and a motor generator.

The hybrid vehicle control system includes an engine, a power storage device, a motor generator, a power converter, and an ECU. The power storage device, the power converter, and the ECU correspond to a battery, a power conversion device, and a control device, respectively.

As described in patent literature 1, when a SOC of the power storage device goes down to a low limit threshold SL, the ECU causes the engine to drive and the motor generator to generate electric power. The SOC represents remaining capacity of a battery and represents a ratio of the remaining capacity to capacity at the time of full charge. The ECU controls the power converter to convert electric power generated by the motor generator and charges the power storage device.

When the SOC of the power storage device reaches an upper limit threshold SU, the ECU stops the engine and terminates the charge of the power storage device.

The inventor of the present application has found the following. The power storage device has a characteristic that a maximum input power reduces when temperature decreases. In a case where the upper limit threshold SU, which is the target value of the SOC, is consistent irrespective of the temperature of the power storage device, when temperature of the power storage device decreases, the electric power that can be supplied to the power storage device, that is, allowable input power, may reduce. A driving condition of the engine may be restrained when the allowable input power reduces and electric power, which is supplied to the power storage device, is generated by the motor generator. For example, the engine may not drive on an efficient drive condition. Fuel consumption of a vehicle may get worse.

Patent literature 1: JP 2013-001373 A

SUMMARY

It is an object of the present disclosure to provide a vehicle control system that can assure allowable input power of a battery sufficiently even when temperature of the battery goes down.

According to an aspect of the present disclosure, a vehicle control system includes an engine mounting to a vehicle and burning fuel to generate driving power, a battery enabling to charge and discharge, a motor generator being supplied with electric power from the battery to generate driving power and being supplied with the driving power from the engine to generate electric power to charge the battery, a power conversion device converting the electric power supplied from the battery and supplying to the motor generator to generate the driving power in the motor generator, and converting the electric power generated by the motor generator and supplying to the battery to charge the battery, and a control device controlling the engine and the power conversion device. When the remaining capacity of the battery is equal to or less than a low limit threshold, the control device controls the engine and the power conversion device so that remaining capacity of the battery becomes a target value. The control device reduces the target value of the remaining capacity of the battery compared with a case where temperature of the battery is equal to or more than a threshold value, when the temperature of the battery is less than the threshold value.

According to the configuration, when the temperature of the battery is less than the threshold value, it may be possible to prevent an increase of the remaining capacity of the battery and to enlarge the allowable input power compared with a case where the target value of the remaining capacity of the battery is set to be constant in a conventional manner. It may be possible to assure the allowable input power of the battery sufficiently even when a maximum input power reduces with temperature decrease of the battery. It may be possible to drive the engine on an efficient condition to charge the battery. Accordingly, it may be possible to avoid a case where a fuel consumption of the vehicle gets worse.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A configuration of a vehicle control system in the first embodiment will be explained with reference to FIG. 1.

Figure 1:
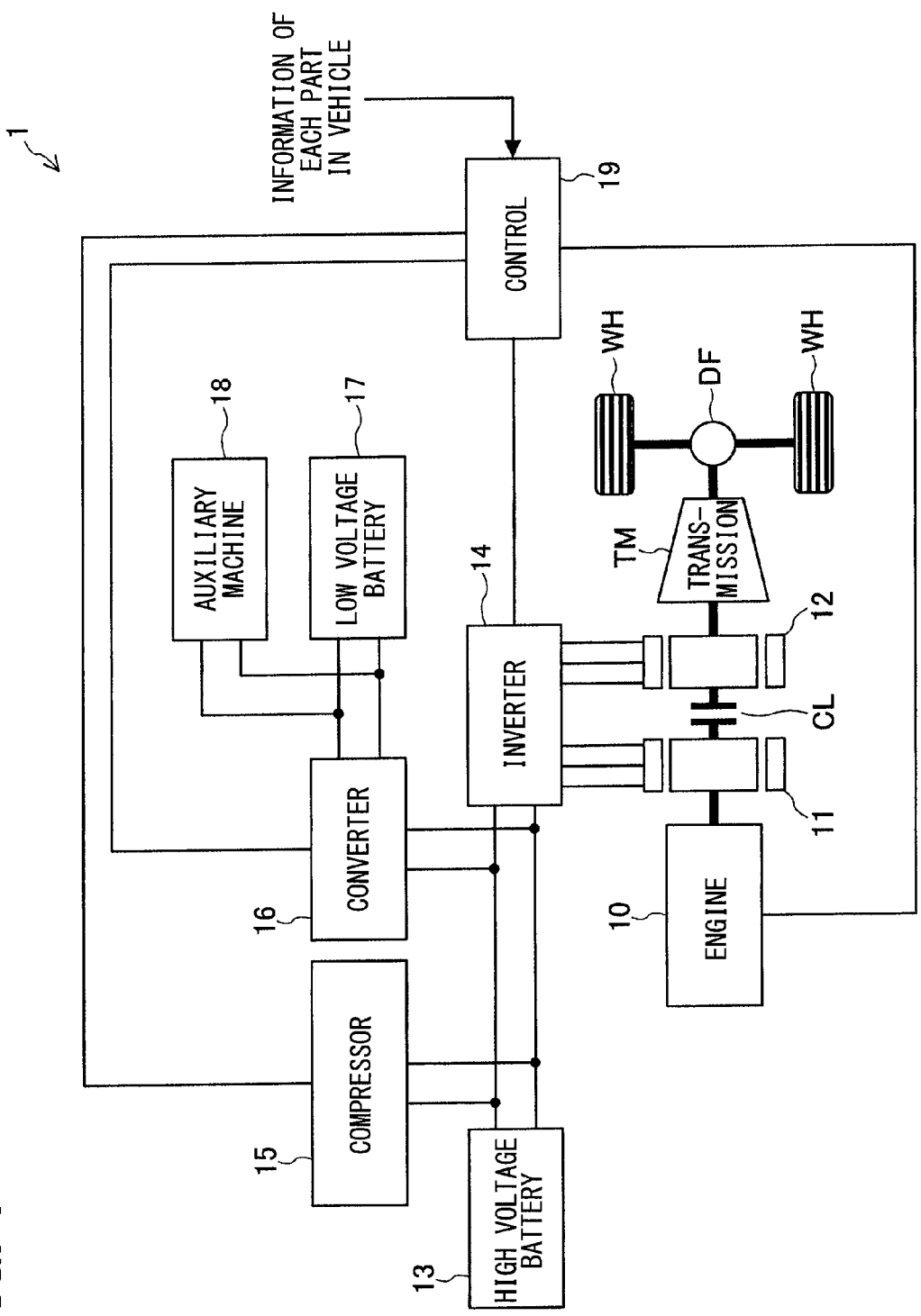
FIG. 1 is a block diagram of a vehicle control system in a first embodiment.

The vehicle control system 1 illustrated in FIG. 1 corresponds to a system that is mounted to a hybrid vehicle and controls the hybrid vehicle. The vehicle control system 1 controls charge of a high voltage battery mounted to a vehicle as one of controls of a hybrid vehicle. The vehicle control system 1 includes an engine 10, motor generators 11, 12, a high voltage battery 13, an inverter 14, an electric compressor 15, a converter 16, a low voltage battery 17, an auxiliary machine 18, and a control device 19. Incidentally, the high voltage battery 13 corresponds to an example of a battery, the inverter 14 corresponds to an example of an power conversion device, the electric compressor 15 corresponds to an example of an electric load, the converter 16 corresponds to an example of an power supply source, and the low voltage battery 17 corresponds to an example of the power supply source.

The engine 10 corresponds to an apparatus that is controlled by the control device 19 and burns fuel to generate driving power for driving a vehicle and the motor generators 11, 12.

The motor generators 11, 12 correspond to an apparatus that operates as a motor by being supplied with electric power from the high voltage battery 13 and generates driving power to drive the vehicle. The motor generators 11, 12 corresponds to an apparatus that operates as a generator by being supplied with driving power from the engine 10 and generates electric power to charge the high voltage battery 13. The motor generator 11 is connected with the inverter 14. The motor generator 11 is coupled with the engine 10, and in addition, is coupled to the motor generator 12 through a clutch CL. The motor generator 12 is connected with the inverter 14. The motor generator 12 is coupled with a wheel WH through a transmission TM and a differential gear DF.

The high voltage battery 13 supplies electric power to the motor generators 11, 12 when the motor generators 11, 12 operate as motors. When the motor generators 11, 12 operate as generators, the high voltage battery 13 is charged by the electric power generated by the motor generators 11, 12. The high voltage battery 13 corresponds to a high voltage chargeable-dischargeable battery.

The inverter 14 corresponds to a device that is controlled by the control device 19, causes the motor generators 11, 12 to operate as motors by supplying electric power to the motor generators 11, 12 after converting the electric power supplied from the high voltage battery 13, and causes the motor generators 11, 12 to generate the driving power. In addition, the inverter 14 corresponds to a device that converts electric power generated by the motor generators 11, 12, supplies electric power to the high voltage battery 13, and charges the high voltage battery 13. The inverter 14 converts direct current supplied from the high voltage battery 13 to three-phase alternate current, supplies the alternate current to the motor generators 11, 12, and causes the motor generators 11, 12 to generate the driving power. The inverter 14 converts three-phase alternate current supplied from the motor generators 11, 12 to direct current, supplies the direct current to the high voltage battery 13, and charges the high voltage battery 13. The inverter 14 is connected to the high voltage battery 13, the motor generators 11, 12, and the control device 19.

The electric compressor 15 corresponds to a device that is controlled by the control device 19, operates by being supplied with electric power from the high voltage battery 13, and compresses refrigerant to adjust temperature of a vehicle compartment. The electric compressor 15 is connected to the high voltage battery 13 and the control device 19.

The converter 16 corresponds to a device that is controlled by the control device 19, converts electric power supplied from the high voltage battery 13, supplies electric power to the low voltage battery 17, and charges the low voltage battery 17. The converter 16 also corresponds to a device that converts electric power supplied from the low voltage battery 17, supplies electric power to the high voltage battery 13, and charges the high voltage battery 13. The converter 16 converts direct current supplied from the high voltage battery 13 to low voltage direct current that is suitable for charge of the low voltage battery 17, supplies the low voltage direct current to the low voltage battery 17, and charges the low voltage battery 17. The converter 16 converts direct current supplied from the low voltage battery 17 to high voltage direct current that is suitable for charge of the high voltage battery 13, supplies the high voltage direct current to the high voltage battery 13, and charges the high voltage battery 13. The converter 16 is connected to a high voltage battery 13, the low voltage battery 17, and the control device 19.

The low voltage battery 17 corresponds to a chargeable-dischargeable battery that is charged by being supplied with electric power from the high voltage battery 13 through the converter 16, supplies electric power to the auxiliary machine 18. The voltage of the low voltage battery 17 is lower than the voltage of the high voltage battery 13.

The auxiliary machine 18 corresponds to a device that is supplied electric power from the low voltage battery 17 to operate. The auxiliary machine 18 is connected to the low voltage battery 17.

The control device 19 corresponds to a device that controls the engine 10, the inverter 14, the electric compressor 15, and the converter 16, based on information of each part of the vehicle. When the SOC (state of charge) of the high voltage battery 13 is equal to or less than a low limit threshold to the SOC, the control device 19 controls the engine 10 and the inverter 14 so that the SOC of the high voltage battery 13 is equal to a target SOC (a target value). The SOC represents remaining capacity of the high voltage battery 13, and represents a ratio of the remaining capacity to capacity at the time of full charge. When temperature of the high voltage battery 13 is less than a threshold value to the temperature, the control device 19 reduces the target SOC of the high voltage battery 13 compared with a case when the temperature of the high voltage battery 13 is equal to or more than the threshold value. The control device 19 is connected to the engine 10, the inverter 14, the electric compressor 15, and the converter 16.

An operation of a charge control of the high voltage battery in the vehicle control system in the first embodiment will be explained with referring to FIG. 1 to FIG. 6. Specifically, a high voltage charge control routine that is periodically repeated will be explained.

Figure 2:
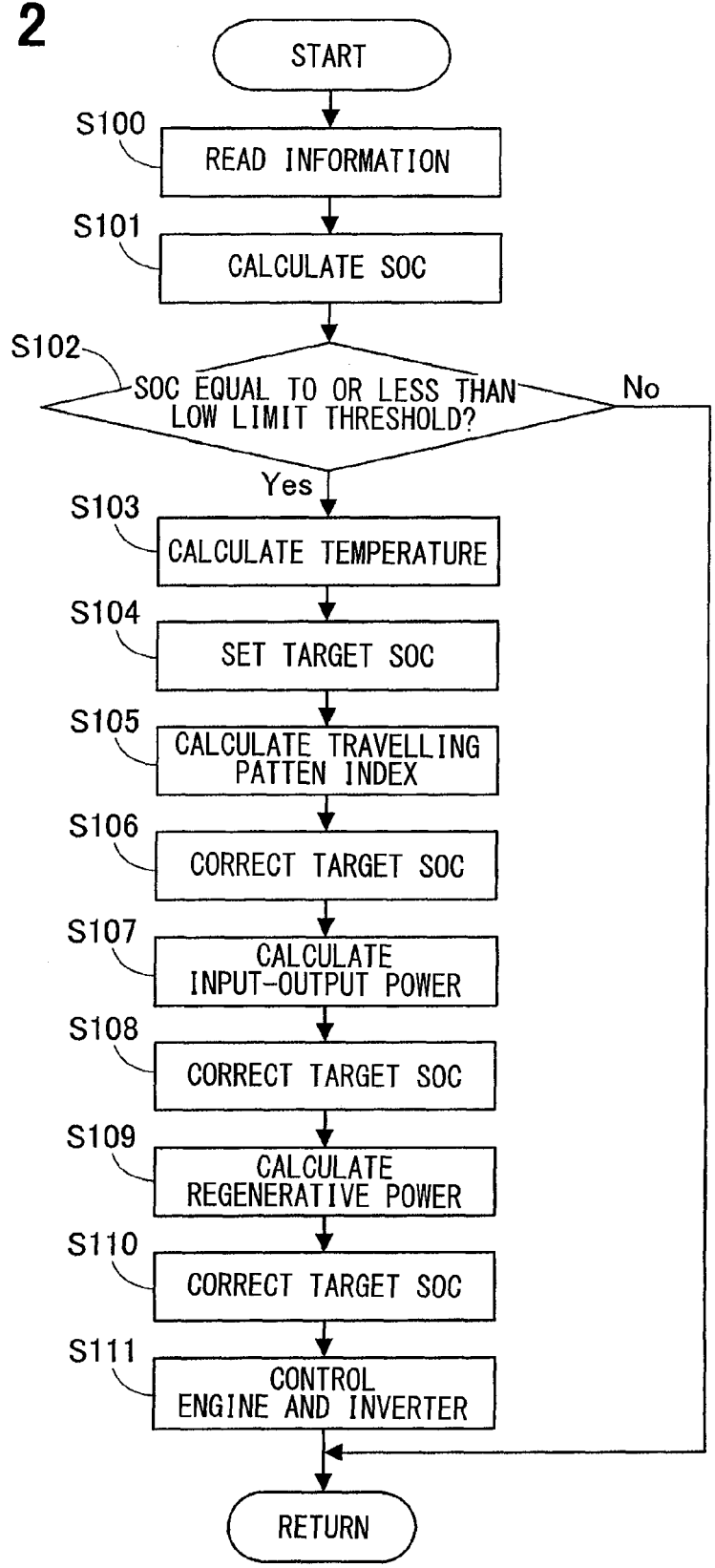
FIG. 2 is a flowchart explaining an operation of a high voltage battery charge control in the vehicle control system illustrated in FIG. 1.

The control device 19 illustrated in FIG. 1 reads information of each part of the vehicle that changes according to a vehicle status as illustrated in FIG. 2 (S100).

The control device 19 calculates the SOC of the high voltage battery 13 based on the read information (S101). The control device 19 determines whether the calculated SOC of the high voltage battery 13 is equal to or less than the low limit threshold to the SOC (S102). At S102, when it is determined that the calculated SOC of the high voltage battery 13 is greater than a low limit threshold to the SOC, it is unnecessary to drive the engine 10, generate electric power in the motor generators 11, 12, and charge the high voltage battery 13. Therefore, the control device 19 terminates the high voltage battery charge control routine.

At S102, when it is determined that the calculated SOC of the high voltage battery 13 is equal to or less than the low limit threshold to the SOC, the control device 19 calculates the temperature of the high voltage battery 13 based on the read information (S103).

Figure 3:
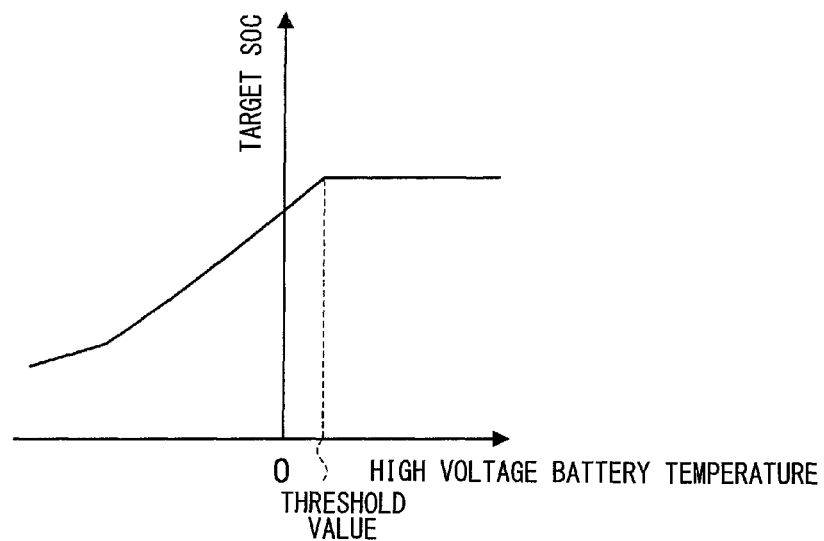
FIG. 3 is a diagram explaining a map illustrating a relationship of temperature and a target SOC of the high voltage battery.

The control device 19 sets the target SOC of the high voltage battery 13 based on a map illustrating a predetermined relationship of the temperature of the high voltage battery 13 and the target SOC and the calculated temperature of the high voltage battery 13 (S104). In the map illustrating the relationship of the temperature of the high voltage battery 13 and the target SOC, the target SOC is set to be a predetermined constant value when the temperature of the high voltage battery 13 is equal to or more than the threshold value to the temperature, as illustrated in FIG. 3. When the temperature of the high voltage battery 13 is less than the threshold value to the temperature, the target SOC is set to be reduced compared with a case where the temperature is equal to or more than the threshold value. The target SOC is set to change according to the temperature of the high voltage battery 13. Specifically, the target SOC is set to be reduced as the temperature of the high voltage battery 13 decreases.

The control device 19 calculates a travelling pattern index of the vehicle based on the read information (S105). The travelling pattern index corresponds to an index regarding to a past or future travelling pattern of the vehicle. The index regarding the future travelling pattern is obtained from a navigation system mounted to the vehicle. Specifically, the index regarding the future travelling pattern corresponds to at least one of average vehicle speed, average vehicle drive output, and average vehicle acceleration and deceleration.

Figure 4:
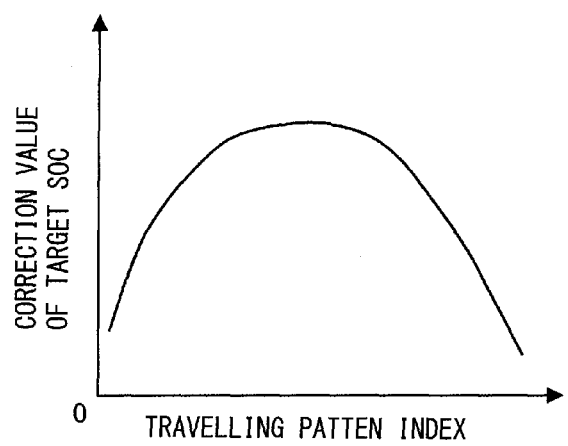
FIG. 4 is a diagram explaining a map illustrating a relationship of a travelling pattern index and a correction value of the target SOC.

The control device 19 calculates a correction value of the target SOC based on a map illustrating a predetermined relationship of the travelling pattern index and a correction value of the target SOC and the calculated travelling pattern index and corrects the target SOC (S106). In the map illustrating the relationship of the travelling pattern index and the correction value of the target SOC, the correction value of the target SOC increases and then reduces as the value of the travelling pattern index increases, as illustrated in FIG. 4. Incidentally, the correction value of the target SOC is set to be a value smaller than a target SOC at the time when the temperature of the high voltage battery 13 is equal to or more than the threshold value in the temperature even after correction of the SOC.

The control device 19 calculates input-output power of the high voltage battery 13 based on the read information (S107). The input power of the high voltage battery 13 corresponds to electric power that is supplied to the high voltage battery 13 through the inverter 14 from the motor generators 11, 12 and corresponds to electric power that is supplied to the high voltage battery 13 from the low voltage battery 17 through the converter 16. The output power of the high voltage battery 13 corresponds to electric power that is supplied to the motor generators 11, 12 from the high voltage battery 13 through the inverter 14 and corresponds to electric power that is supplied to the electric compressor 15 from the high voltage battery 13.

Figure 5:
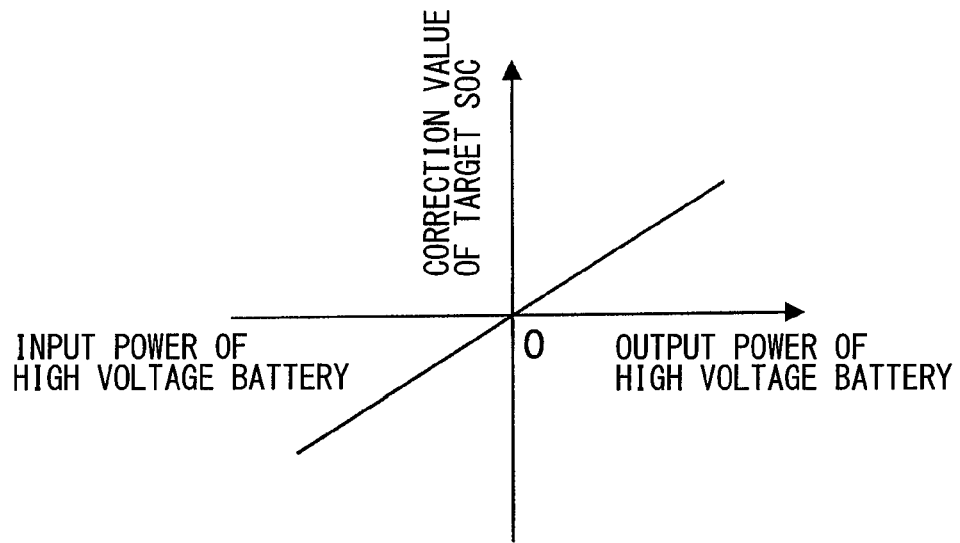
FIG. 5 is a diagram explaining a map illustrating an input-output power of the high voltage battery and the correction value of the target SOC.

The control device 19 calculates the correction value of the target SOC based on a map illustrating a predetermined relationship of the input-output power of the high voltage battery 13 and the correction value of the target SOC and the calculated input-output power of the high voltage battery 13, and further corrects the target SOC (S108). Incidentally, in the map illustrating the relationship of the input-output power of the high voltage battery 13 and the correction value of the target SOC, the correction value of the target SOC decreases as the input power increases as illustrated in FIG. 5 in a case where the output power of the high voltage battery 13 corresponds to positive. The correction value of the target SOC increases as the output power increases. The correction value of the target SOC is set to be a value smaller than a target SOC at the time when the temperature of the high voltage battery 13 is equal to or more than the threshold value to the temperature.

The control device 19 calculates regenerative power generated by regenerative operation of the motor generators 11, 12 (S109). The regenerative operation of the motor generators 11, 12 is predicted based on the read information. Specifically, the regenerative power is calculated based on the above travelling pattern index of the vehicle.

Figure 6:
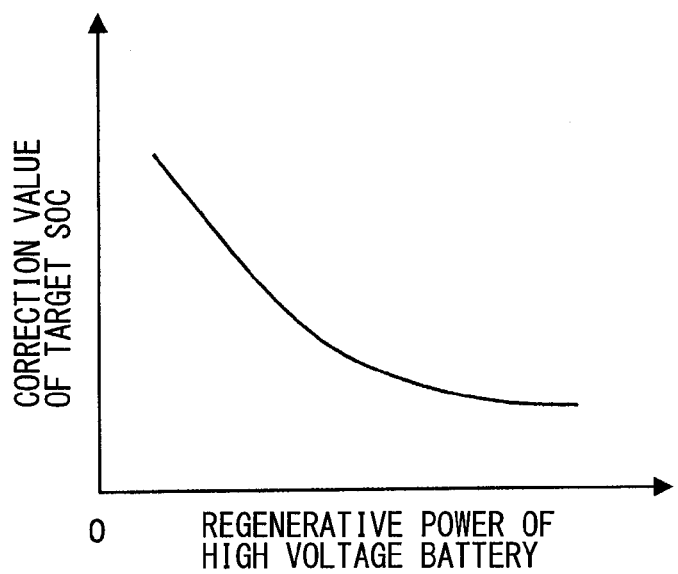
FIG. 6 is a diagram explaining a map illustrating a relationship of regenerative power and the correction value of the target SOC.

The control device 19 calculates the correction value of the target SOC based on a map illustrating a predetermined relationship of the regenerative power and the correction value of the target SOC and the calculated predicted regenerative power, and further corrects the target SOC (S110). In the map illustrating the relationship of the regenerative power and the correction value of the target SOC, the correction value of the target SOC decreases as the value of the regenerative power increases as illustrated in FIG. 6. Incidentally, the correction value of the target SOC is set to be a value smaller than a target SOC at the time when the temperature of the high voltage battery 13 is equal to or more than the threshold value to the temperature.

The control device 19 controls the engine 10 and the inverter 14 so that the SOC of the high voltage battery 13 is equal to the corrected target SOC (S111). Accordingly, the high voltage battery 13 is charged, and the SOC of the high voltage battery 13 is equal to the corrected target SOC. The control device 19 terminates the high voltage battery charge control routine.

Figure 7:
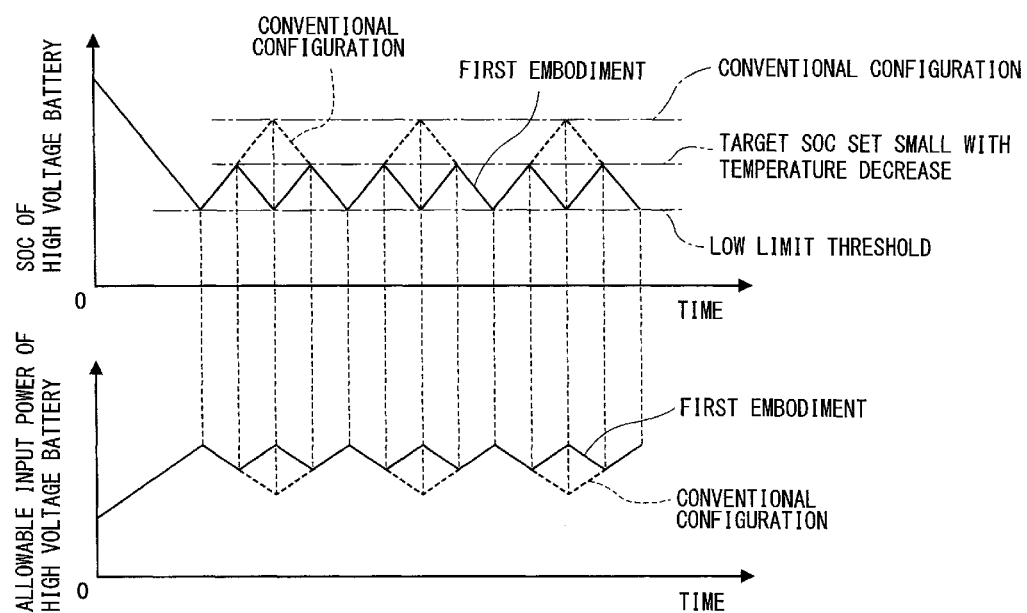
FIG. 7 is a diagram explaining a relationship of a SOC of the high voltage battery and allowable input power.

As illustrated in FIG. 7, when the SOC of the high voltage battery 13 goes down to the low limit threshold to the SOC, the electric power is supplied to the high voltage battery 13, and the high voltage battery 13 is charged. As a result, the SOC of the high voltage battery 13 increases. In a conventional case, irrespective of temperature of the high voltage battery 13, the target SOC of the high voltage battery 13 is set to a constant value. According to the first embodiment, as illustrated in FIG. 3, in a case where the temperature of the high voltage battery 13 is less than a threshold value to the temperature, the control device 19 reduces the target SOC of the high voltage battery 13 compared with a case where the temperature of the high voltage battery 13 is equal to or more than the threshold value. As illustrated in FIG. 7, in a case where the temperature of the high voltage battery 13 is less than the threshold value to the temperature, it may be possible to prevent an increase of the SOC of the high voltage battery 13 and to enlarge the allowable input power compared with a case where the target SOC is set to be a constant value like a conventional case. Therefore, even when a maximum input power decreases with temperature decrease of the high voltage battery 13, it may be possible to assure the allowable input power of the high voltage battery 13 sufficiently. As a result, it may be possible to drive the engine 10 on an efficient condition to charge the high voltage battery 13. Accordingly, it may be possible to avoid a case where a fuel consumption of the vehicle gets worse.

The maximum input power of high voltage battery 13 changes according to the temperature of high voltage battery 13. According to the first embodiment, the control device 19 sets the target SOC of the high voltage battery 13 based on the temperature of the high voltage battery 13, as described in FIG. 3. It may be possible to properly set the target SOC according to the temperature of the high voltage battery 13. Therefore, even when the temperature of the high voltage battery 13 decreases, it may be possible to assure the allowable input power of the high voltage battery 13 sufficiently.

When the target SOC decreases with temperature decrease of the high voltage battery 13, a feeding and stop of electric power to the high voltage battery 13 are repeated frequently. As a result, driving and stop of the engine 10 are repeated frequently, and the fuel consumption of the vehicle may get worse. According to the first embodiment, as illustrated in FIG. 4, the control apparatus 19 calculates the correction value of the target SOC of the high voltage battery 13 and corrects the target SOC. The target SOC of the high voltage battery 13 is set based on the index regarding the travelling pattern of the vehicle. That is, based on the index regarding the travelling pattern of the vehicle, the target SOC of the high voltage battery 13 is set up. The electric power that can be supplied to the high voltage battery 13 changes according to the travelling pattern of the vehicle. Therefore, according to the electric power that can be supplied to the high voltage battery 13, it may be possible to set the target SOC properly. Therefore, it may be possible to avoid a case where the driving and the stop of the engine 10 are repeated frequently and the fuel consumption of the vehicle gets worse to the utmost.

According to the first embodiment, the control device 19 sets the target SOC of the high voltage battery 13 based on the index regarding the past or future travelling pattern of the vehicle. According to the electric power that can be supplied to the high voltage battery 13, it may be possible to set the target SOC properly.

According to the first embodiment, the index regarding the travelling pattern of the vehicle corresponds to at least one of the average vehicle speed, the average vehicle drive output, and the average vehicle acceleration and deceleration. It may be possible to calculate electric power that can be supplied to the high voltage battery 13 surely.

When the input power of the high voltage battery 13 is large, a time until the SOC reaches the target SOC becomes short. When the output power of the high voltage battery 13 is large, a time until the SOC reaches the low limit threshold of the SOC becomes short. The feeding and the stop of the electric power to the high voltage battery 13 may be repeated frequently. As a result, the driving and the stop of the engine 10 may be repeated frequently, and the fuel consumption of the vehicle may get worse. According to the first embodiment, as illustrated in FIG. 5, the control apparatus 19 calculates the correction value of the target SOC of the high voltage battery 13 and corrects the target SOC. The target SOC of the high voltage battery 13 is set based on the input power and the output power of the high voltage battery 13. Based on the input power and the output power of the high voltage battery 13, the target SOC of the high voltage battery 13 is set up. The input power of the high voltage battery 13 corresponds to electric power that is supplied to the high voltage battery 13 from the motor generators 11, 12 and corresponds to electric power that is supplied to the high voltage battery 13 from the low voltage battery 17. The output power of the high voltage battery 13 corresponds to electric power that is supplied to the motor generators 11, 12 from the high voltage battery 13 and corresponds to electric power that is supplied to the electric compressor 15 from the high voltage battery 13. It may be possible to avoid a case where the feeding and the stop of the electric power to the high voltage battery 13 are repeated frequently to the utmost. Therefore, it may be possible to avoid a case where the driving and the stop of the engine 10 are repeated frequently and the fuel consumption of the vehicle gets worse to the utmost.

When the electric power generated by the regenerative operation of the motor generators 11, 12 is large, a time until the SOC reaches the target SOC becomes short. Thus, the feeding and the stop of the electric power to the high voltage battery 13 may be repeated frequently. As a result, the driving and the stop of the engine 10 may be repeated frequently, and the fuel consumption of the vehicle may get worse. According to the first embodiment, as illustrated in FIG. 6, the control apparatus 19 calculates the correction value of the target SOC of the high voltage battery 13 and corrects the target SOC. The target SOC of the high voltage battery 13 is set based on the electric power generated by the regenerative operation of the motor generators 11, 12. Based on the electric power generated by the regenerative operation of motor generators 11 12, the target SOC of the high voltage battery 13 is set up. It may be possible to avoid a case where the feeding and the stop of the electric power to the high voltage battery 13 are repeated frequently to the utmost. Therefore, it may be possible to avoid a case where the driving and the stop of the engine 10 are repeated frequently and the fuel consumption of the vehicle gets worse to the utmost.

The regenerative power of the motor generators 11, 12 changes according to the driving state of the vehicle. According to the first embodiment, the control device 19 calculates the electric power generated by the regenerative operation of the motor generators 11, 12 based on the index regarding the travelling pattern of the vehicle. Specifically based on the index regarding the past or the future of the vehicle, the electric power generated by the regenerative operation is calculated. The index regarding the travelling pattern of the vehicle corresponds to at least one of the average vehicle speed, the average vehicle drive output, and the average vehicle acceleration and deceleration. It may be possible to calculate the regenerative power of the motor generators 11, 12 surely.

Although the vehicle control system 1 in the first embodiment includes the electric compressor 15 as the electric load that operates by being supplied with electric power from the high voltage battery 13, the electric load is not limited to this case. The vehicle control system 1 may include a blower fan or an electric heater as the electric load that operates by being supplied with electric power from the high voltage battery 13. The vehicle control system 1 may include at least one of the electric compressor, the blower fan, and the electric heater.

Although the electric power can be supplied to the high voltage battery 13 through the converter 16 from the low voltage battery 17 in the first embodiment, it is not limited to this case. The low voltage battery 17 may not supply the high voltage battery 13 with the electric power. In this case, the input power of the high voltage battery 13 corresponds to only electric power that is supplied to the high voltage battery 13 through the inverter 14 from the motor generators 11, 12.

It is noted that a flowchart or a processing of the flowchart in the present application includes steps (also referred to as sections), each of which is represented, for example, as S100. Further, each step may be divided into several sub-steps, and several steps may be combined into a single step.

The embodiments, configurations, and aspects of the vehicle control system according to the present disclosure have been exemplified, but the embodiments, the configurations, and the aspects according to the present disclosure are not limited to the respective embodiments and the respective configurations described above. The embodiments and the configurations obtained by appropriately combining the respective technical elements disclosed in the different embodiments and configurations together also fall within the scope of the embodiments and the configurations according to the present disclosure.

What is claimed is:

1. A vehicle control system comprising:
an engine mounting to a vehicle and burning a fuel to generate driving power;
a battery enabling to charge and discharge;
a motor generator being supplied with electric power from the battery to generate driving power, and being supplied with the driving power from the engine to generate electric power and charge the battery;
a power conversion device converting the electric power supplied from the battery and supplying to the motor generator to generate the driving power in the motor generator, and converting the electric power generated by the motor generator and supplying to the battery to charge the battery; and
a control device controlling the engine and the power conversion device,
wherein:
when a remaining capacity of the battery is equal to or less than a low limit threshold, the control device controls the engine and the power conversion device so as to make the remaining capacity of the battery reach a target value;
when a temperature of the battery is less than a threshold value, the control device reduces the target value of the remaining capacity of the battery compared with a case where the temperature of the battery is equal to or more than the threshold value; and
the control device sets the target value of the remaining capacity of the battery based on the temperature of the battery, and corrects the target value that has been set based on the temperature of the battery, further based on electric power generated by regenerative operation of the motor generator to generate a corrected target value.

2. The vehicle control system according to claim 1, wherein
the control device sets the target value of the remaining capacity of the battery based on an index regarding a travelling pattern of the vehicle.

3. The vehicle control system according to claim 2, wherein
the control device sets the target value of the remaining capacity of the battery based on the index regarding the travelling pattern of the vehicle in a past or a future.

4. The vehicle control system according to claim 2, wherein
the index regarding the travelling pattern of the vehicle corresponds to at least one of average vehicle speed, average vehicle drive output, and average vehicle acceleration and deceleration.

5. The vehicle control system according to claim 1, wherein
the control device sets the target value of the remaining capacity of the battery based on input power of the battery and output power of the battery.

6. The vehicle control system according to claim 5, further comprising:
a power supply source supplying electric power to the battery,
wherein
the input power of the battery corresponds to the electric power that is supplied to the battery from the motor generator and corresponds to the electric power that is supplied to the battery from the power supply source.

7. The vehicle control system according to claim 5, further comprising
an electric load being supplied with the electric power from the battery to operate,
wherein
the output power of the battery corresponds to the electric power that is supplied to the motor generator from the battery and corresponds to the electric power that is supplied to the electric load from the battery.

8. The vehicle control system according to claim 7, wherein
the electric load corresponds to at least one of an electric compressor, a blower fan, and an electric heater.

9. The vehicle control system according to claim 1, wherein
the control device calculates the electric power generated by the regenerative operation of the motor generator based on an index regarding a travelling pattern of the vehicle.

10. The vehicle control system according to claim 9, wherein
the control device calculates the electric power generated by the regenerative operation of the motor generator based on the index regarding the travelling pattern of the vehicle in a past or future.

11. The vehicle control system according to claim 9, wherein
the index regarding the travelling pattern of the vehicle corresponds to at least one of average vehicle speed, average vehicle drive output, and average vehicle acceleration and deceleration.

12. The vehicle control system according claim 1, further comprising:
a low voltage battery that receives the electric power from the battery,
wherein the vehicle is provided by a hybrid vehicle that uses the engine and the motor generator to generate the driving power.

* * * * *